(12) United States Patent
Nishiura et al.

(10) Patent No.: US 8,109,570 B2
(45) Date of Patent: Feb. 7, 2012

(54) WIRING STRUCTURE FOR HEAD REST

(75) Inventors: Takeshi Nishiura, Nissin (JP); Atsuki Sasaki, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 312 days.

(21) Appl. No.: 12/593,065

(22) PCT Filed: Dec. 26, 2007

(86) PCT No.: PCT/JP2007/074970
§ 371 (c)(1),
(2), (4) Date: Sep. 25, 2009

(87) PCT Pub. No.: WO2008/120427
PCT Pub. Date: Oct. 9, 2008

(65) Prior Publication Data
US 2010/0127542 A1    May 27, 2010

(30) Foreign Application Priority Data

Mar. 28, 2007 (JP) ................................. 2007-084336

(51) Int. Cl.
*A47C 31/00* (2006.01)
(52) U.S. Cl. .................. 297/217.3; 297/410; 297/463.1; 297/463.2

(58) Field of Classification Search ............... 297/463.1, 297/463.2, 217.3, 410
See application file for complete search history.

(56) References Cited

U.S. PATENT DOCUMENTS

| 2001/0000419 A1* | 4/2001 | Heilig ........................... 297/410 |
| 2007/0052266 A1* | 3/2007 | Chu ............................ 297/217.3 |
| 2007/0102973 A1* | 5/2007 | Vitito ......................... 297/217.3 |
| 2008/0277990 A1 | 11/2008 | Yasukawa et al. |

FOREIGN PATENT DOCUMENTS

| JP | 2-52632 | 4/1990 |
| JP | 3-286713 | 12/1991 |
| JP | 7-30785 | 6/1995 |

OTHER PUBLICATIONS

English language Abstract of JP 3-286713, Dec. 17, 1991.

* cited by examiner

*Primary Examiner* — Laurie Cranmer
(74) *Attorney, Agent, or Firm* — Greenblum & Bernstein, P.L.C.

(57) ABSTRACT

A stay is provided with an insulating member, so that only a lower stay body disposed on a lower side of the insulating member can be energized. Further, the lower stay body is set at a position in which the lower stay body is not exposed to an interior of the seat back when the head rest is vertically adjustably connected to the seat back.

2 Claims, 17 Drawing Sheets

WIRING STRUCTURE FOR HEAD REST

TECHNICAL FIELD

The present invention relates to a wiring structure for a head rest attached to a seat back of a vehicle seat. More particularly, the present invention relates to a wiring structure for a head rest for supplying electric power to an electrical component electrically connected to a stay formed of a tubular metal member and disposed in a head rest that is vertically adjustably connected to a seat back via the stay, in which a stationary electrode electrically connected to power source wiring disposed on the seat back side is electrically connectably pressed against an outer circumferential surface of the stay, so that the stay itself can be used as a portion of an electrically conducting path.

BACKGROUND ART

An example of a wiring structure of this type is art taught by Japanese Laid-Open Utility Model Publication No. 7-30785. In this art, in order to supply electric power to a driving motor disposed in a head rest vertically adjustably connected to a seat back, a construction in which two stays formed of tubular metal members connecting the head rest to the seat back are themselves used as an electric circuit. Naturally, from a viewpoint of preventing short-circuiting between the two stays, in order to prevent metal portions of the stays from being exposed in a use condition of the head rest, the metal portions of the stays are covered with insulating members. Thus, because the metal portions are covered with the insulating members, when the electric power is supplied to the driving motor, the metal portions in energized conditions are prevented from being exposed.

Thus there is a need in the art to provide a wiring structure for a head rest for supplying electric power to an electrical component disposed in a head rest that is vertically adjustably connected to a seat back via a stay formed of a tubular metal member, in which the stay itself can be used as an electrically conducting path and in which a metal portion of the stay in an energized condition can be prevented from being exposed regardless of a vertical position of the head rest in a use condition thereof.

SUMMARY OF THE INVENTION

The present invention provides a wiring structure for a head rest for supplying electric power to an electrical component electrically connected to a stay formed of a tubular metal member and disposed in a head rest that is vertically adjustably connected to a seat back via the stay, in which a stationary electrode electrically connected to power source wiring disposed on the seat back side is electrically connectably pressed against an outer circumferential surface of the stay, so that the stay itself can be used as a portion of an electrically conducting path. The stay is provided with an insulating member that is disposed in a vertically intermediate position thereof. An upper stay body disposed on an upper side of the insulating member is electrically insulated with a lower stay body disposed on a lower side of the insulating member. The lower stay body is set at a position in which the lower stay body is not exposed to an interior of the seat back when the head rest is vertically adjustably connected to the seat back. The lower stay body and the electrical component are electrically connected to each other via wiring disposed in the upper stay body, so that the electric power can be supplied to the electrical component from the power source wiring.

According to this structure, only the lower stay body disposed on the lower side of the insulating member may function as an energized portion. Conversely, the upper stay body may function as a non-conducting portion. Further, the lower stay body is always maintained in a condition in which it is inserted into a support (a condition in which it is hidden inside the seat back) regardless of a vertical position of the head rest in a use condition thereof. Thus, even when the electric power is supplied to the electrical component, the lower stay body, i.e., a metal portion in an energized condition, can be prevented from being exposed.

Further, in the present invention, an engagement portion engageable with the seat back side can be formed in the stay at a lowermost position of a vertically controllable range thereof. In addition, an engaged portion engageable with the engagement portion can be formed in the seat back side. According to this structure, the head rest can be easily vertically adjusted with respect to the seat back.

BEST MODE FOR CARRYING OUT THE INVENTION

In the following, embodiments of the best mode for carrying out the present invention will be described with reference to the drawings.

Embodiment 1

Embodiment 1 will be described with reference to FIGS. 1 to 8. In FIGS. 1 to 8, in order to clearly show an inner construction of a seat back 10, a skin structure of the seat back 10 is omitted and only an inner frame structure thereof is shown.

Figure 1:
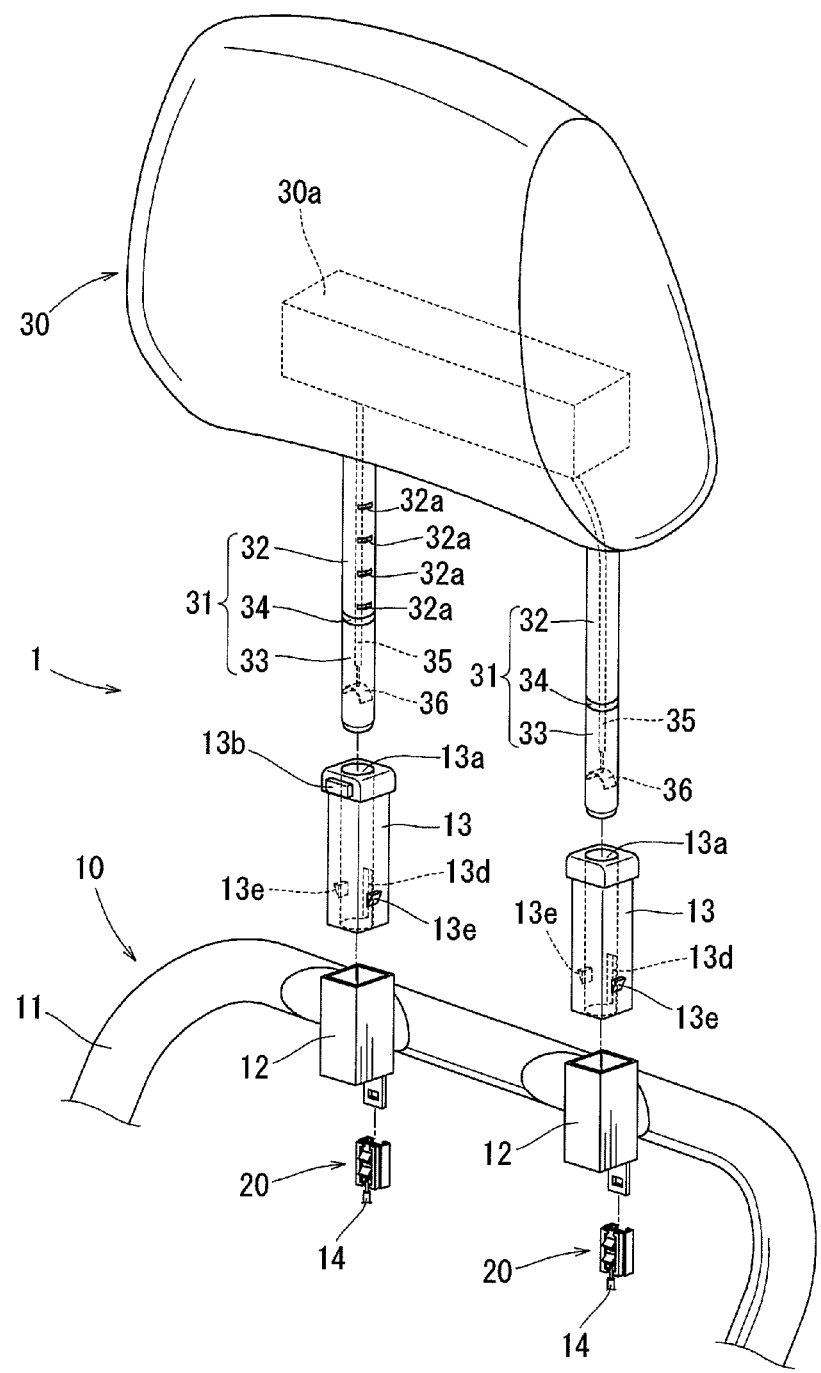
FIG. 1 is an exploded perspective view of a vehicle seat 1 to which a wiring structure for a head rest according to one embodiment (Embodiment 1) of the present invention is applied.

First, the components of a vehicle seat 1 will be described with reference to FIG. 1. The vehicle seat 1 is a seat having a head rest 30 that is attached to the seat back 10. In the following, the seat back 10 and the head rest 30 will be described individually.

Figure 2:
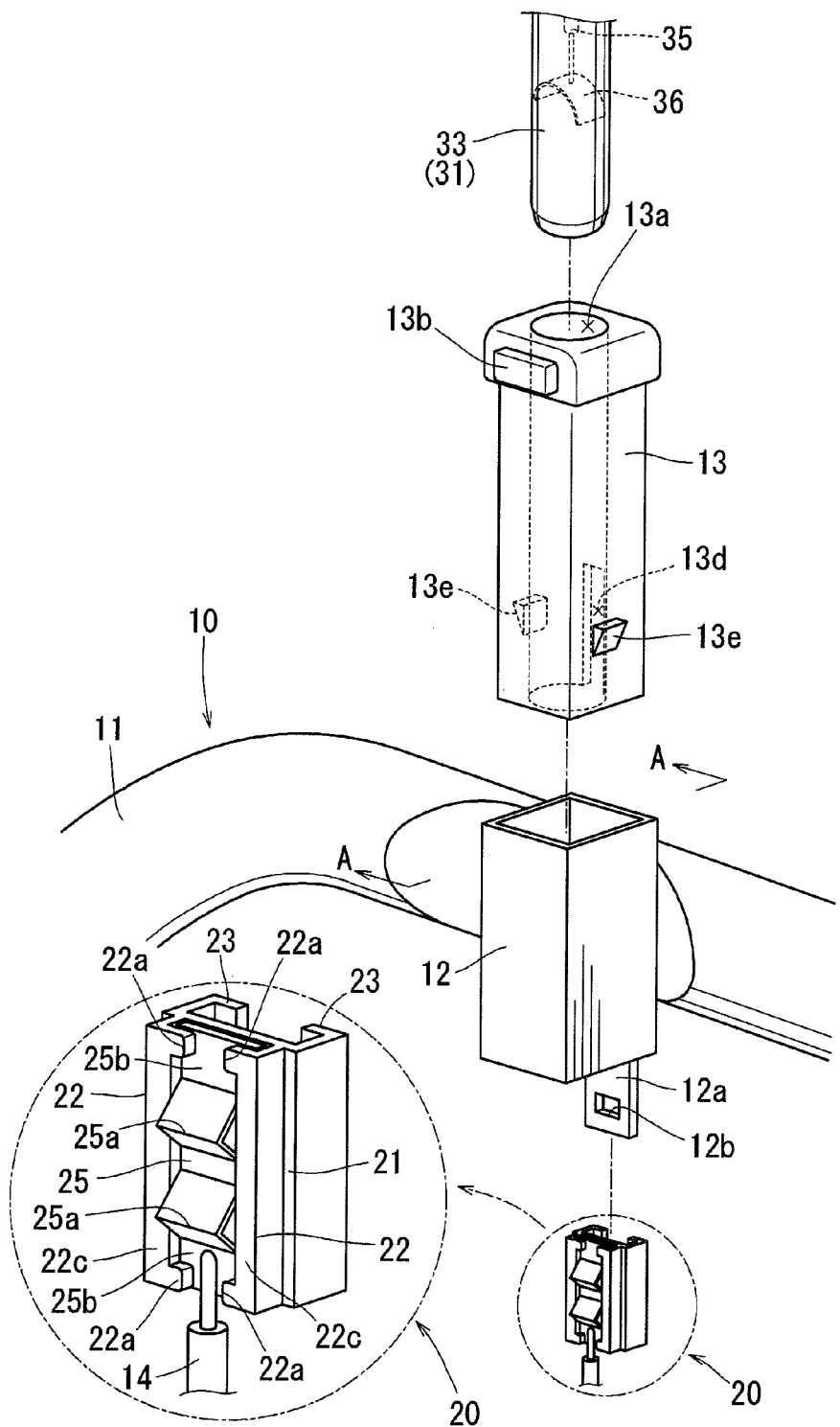
FIG. 2 is an enlarged view of a main portion of FIG. 1.
Figure 3:
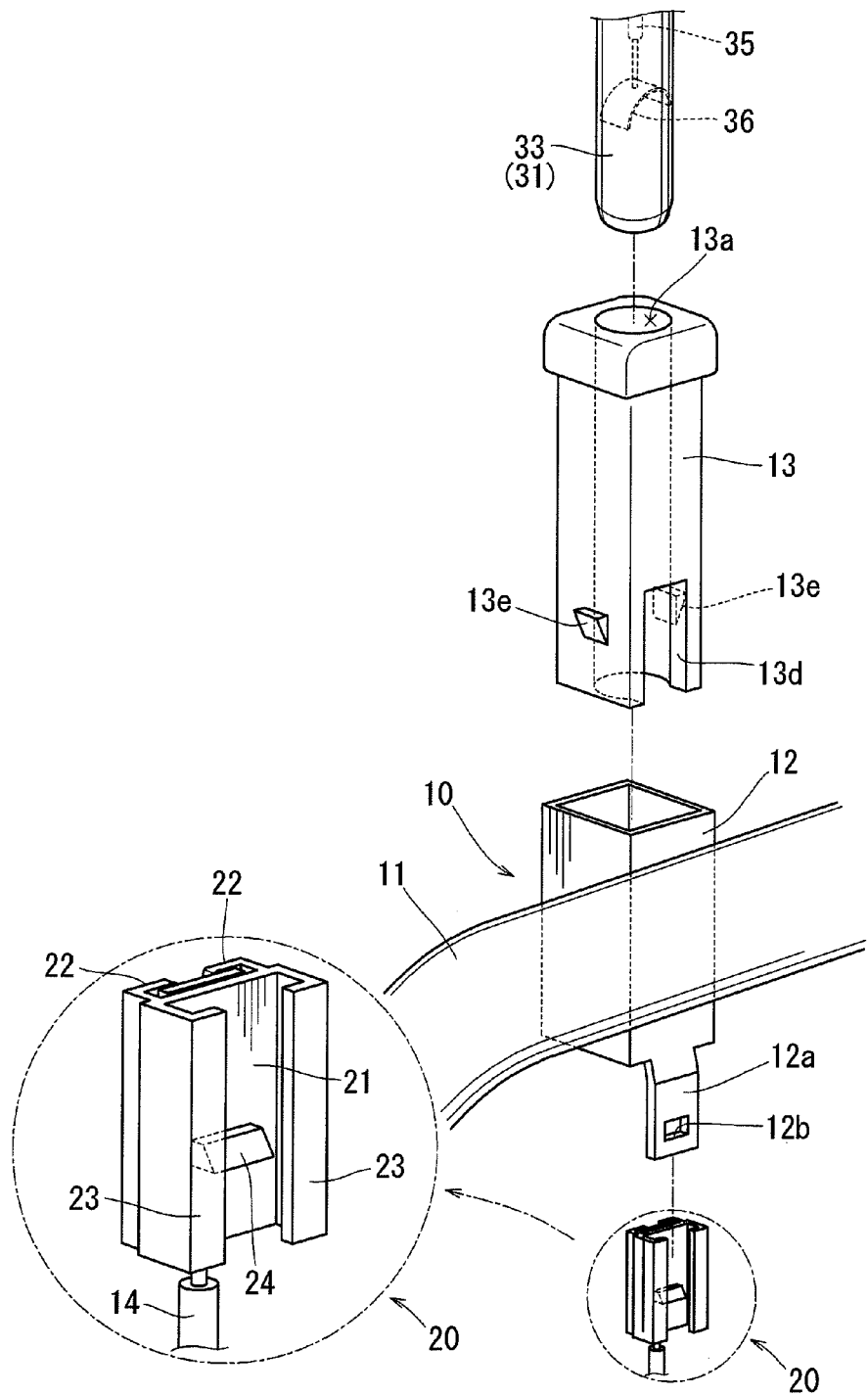
FIG. 3 is a rear perspective view of FIG. 2.

First, the seat back 10 will be described. Square-tube-shaped holders 12 are respectively welded to right and left sides of an upper arm portion of a back frame 11 that forms a framework of the seat back 10. The holders 12 can be fitted with supports 13 each having an insertion hole 13a into which stays 31 of the head rest 30 are inserted. As shown in FIGS. 2 and 3, an attachment strip 12a is integrally formed in a back side of each of the holders 12 so as to extend downwardly from a lower end portion thereof. Each of the attachment strips 12a has an engagement hole 12b to which a base member 21 of each of electrode bodies 20 is connected.

Each of the electrode bodies 20 is constructed of the base member 21 made of resin and an electrode 25 attached to the base member 21. As will be apparent from a partially enlarged view in FIG. 2, the electrode 25 is constructed of a plate spring having a substantially M-shape in cross section. Further, the electrode 25 can be referred to as "a stationary electrode". Two guides 22 each having a substantially L-shape in cross section are formed in one surface (a nearer surface in FIG. 2) of the base member 21. The guides 22 are formed opposite to each other so as to retain the electrode 25 therebetween. Upper and lower ends of each of the guides 22 respectively have support claws 22a that are respectively directed inwardly.

When the electrode 25 is attached to the base member 21, in order to prevent leg portions 25b of the M-shaped electrode 25 from interfering with the support claws 22a, the electrode 25 is placed between the guides 22 while protruding portions 25a of the M-shaped electrode 25 are gradually compressed in a direction toward each other. Thereafter, when the protruding portions 25a are decompressed, the leg portions 25b of the M-shaped electrode 25 can move in a direction away from each other. As a result, the leg portions 25b are supported by the total of four support claws 22a. In this way, the electrode 25 can be attached to the base member 21. Further, the protruding portions 25a of the M-shaped electrode 25 are set to greatly protrude from surfaces 22c of the guides 22 in an attached condition.

As will be apparent from a partially enlarged view in FIG. 3, two guides 23 are formed in the other surface (a farther surface in FIG. 3) of the base member 21. The guides 23 are formed opposite to each other so as to receive right and left peripheral edges of the attachment strip 12a of the holder 12 therebetween. Further, formed in the other surface is an engagement claw 24 that is capable of engaging the engagement hole 12b of the holder 12. Therefore, when the guides 23 of the base member 21 are vertically fitted to the right and left peripheral edges of the attachment strip 12a from below, a lower end portion of the attachment strip 12b can be flexed by the engagement claw 24. Thereafter, when the lower end portion of the attachment strip 12a clears the engagement claw 24, the engagement claw 24 engages the engagement hole 12b. Upon engagement of the engagement claw 24 and the engagement hole 12b, the electrode body 20 is attached to the holder 12. Further, the electrode 25 of the electrode body 20 is electrically connected to power source wiring 14 (wiring extended from a vehicle body side and connected to a battery (not shown)) that is disposed on the seat back side.

Conversely, as shown in FIGS. 5 to 8, an engagement claw 13c (omitted in FIGS. 1 to 3) is disposed in an inner circumferential surface of the insertion hole 13a of the support 13. The engagement claw 13c is biased to project into the insertion hole 13a. When the stay 31 is inserted into the support 13, the engagement claw 13c engages one of a plurality of engagement grooves 32a (which will be described hereinafter) that are longitudinally formed in the stay 31 (an upper stay body 32 thereof) of the head rest 30, so that its movement in the inserting direction can be stopped. Therefore, the head rest 30 can be vertically adjustably connected to the seat back 10. Another way to describe this is that "a head rest that is vertically adjustably connected to a seat back via the stay" and "an engagement portion engageable with the seat back side is formed in the stay at a lowermost position of a vertically controllable range thereof, and an engaged portion engageable with the engagement portion is formed in the seat back side". Thus, the head rest 30 can be vertically adjusted with respect to the seat back 10 in a simplified manner. Further, the engagement claw 13c is integrally formed with a knob 13b disposed on an upper side portion of the support 13, so as to normally be held in a condition in which it is projected into the insertion hole 13a via a biasing force of a biasing member such as a spring (not shown).

Figure 5:
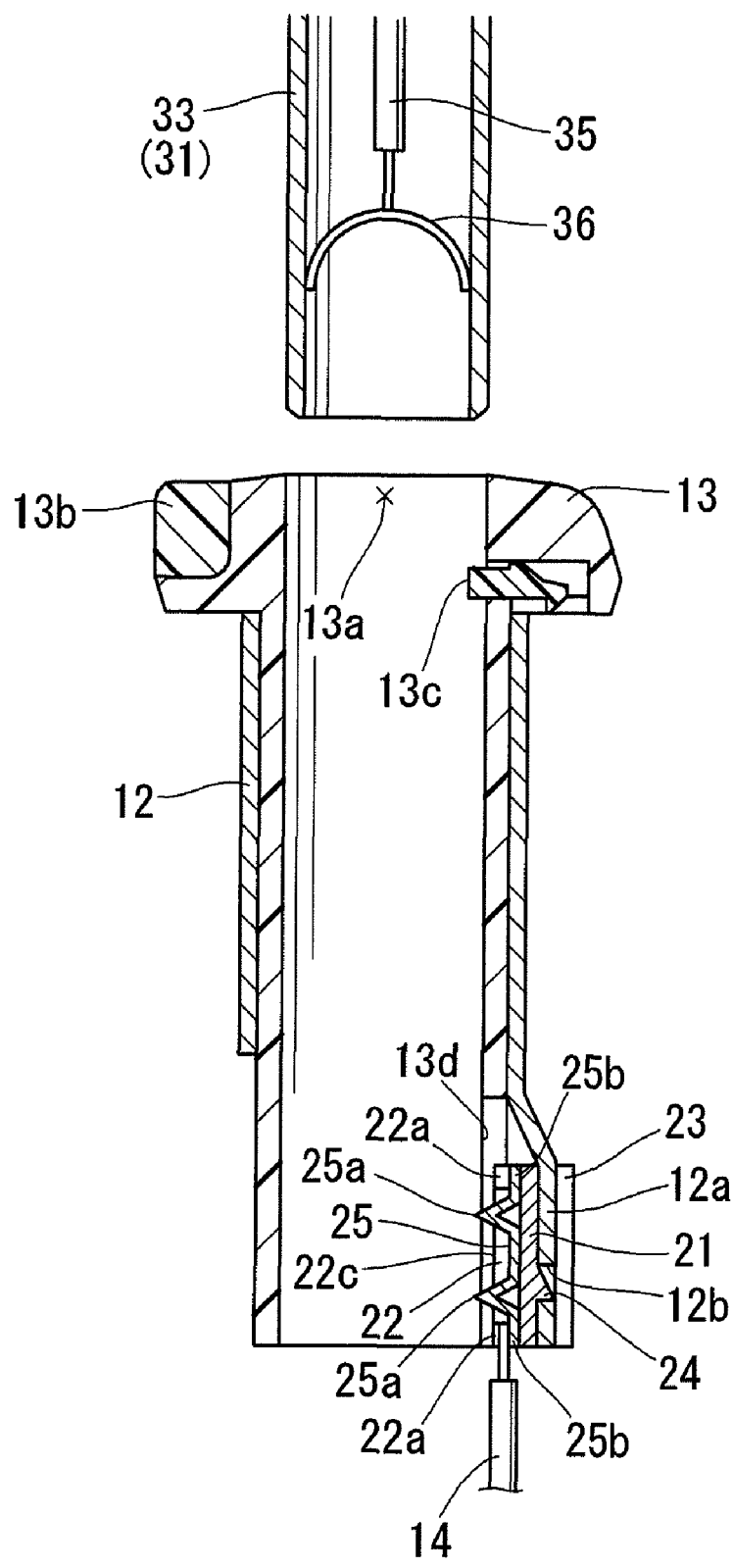
FIG. 5 is a sectional view taken along line A-A of FIG. 2, in which a support 13 is connected to a holder 12 to which an electrode body 20 is attached.

With reference to FIGS. 1 to 3 again, each of the supports 13 has protruded engagement claws 13e that are capable of preventing the support 13 from being removed from the holder 12 when it is inserted into the holder 12 so as to be attached thereto. The engagement claws 13e are formed in right and left side surfaces of the support 13. The engagement claw 13e has a substantially U-shaped groove (not shown) that is formed in a peripheral edge thereof. Therefore, when the support 13 is inserted into the holder 12, the engagement claws 13e of the support 13 are pressed against an inner circumferential surface of the holder 12 and are flexed inwardly. Thereafter, when the support 13 is completely inserted, the engagement claws 13e of the support 13 can be restored, so as to be hooked on the lower end portion of the holder 12. Thus, the support 13 inserted into the holder 12 can be prevented from being detached. Further, the support 13 has a cutout 13d that is formed in a lower end of a back surface thereof. The cutout 13d allows the protruding portions 25a of the electrode 25 of the electrode body 20 attached to the holder 12 to protrude into the support 13 therethrough (FIG. 5).

Figure 4:
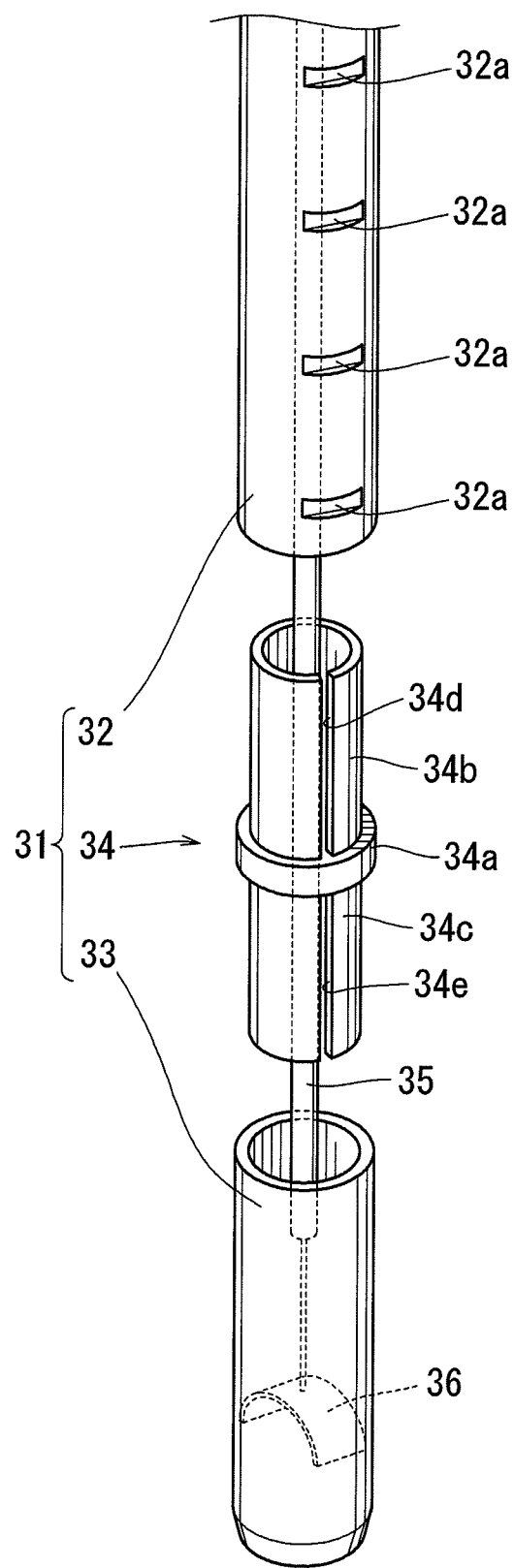
FIG. 4 is an exploded perspective view of a stay 31 shown in FIGS. 1 to 3.

Next, the head rest 30 will be described. With reference to FIG. 1 again, as described above, the head rest 30 has two stays 31 formed of tubular metal members. The stays 31 are integrally attached to a lower surface of the head rest 30. Further, an electrical component 30a such as a driving motor is disposed in the head rest 30. Now, construction of the stays 31 will be described in detail. As shown in FIG. 4, each of the stays 31 is composed of an upper stay body 32 formed of a tubular metal member, a lower stay body 33 formed of a tubular metal member, and an insulating member 34 that integrally connects the upper and lower stay bodies 32 and 33. The upper stay body 32 and the lower stay body 33 are electrically insulated from each other due to the insulating member 34.

The insulating member 34 is composed of a ring-shaped flange portion 34a, an upper protrusion body 34b and a lower protrusion body 34c and is integrally formed of a synthetic resin. The flange portion 34a has the same outer diameter as the upper and lower stay bodies 32 and 33. The upper protrusion body 34b protrudes from an upper surface of the flange portion 34a and is shaped to be inserted into an interior of the upper stay body 32 from a lower end thereof. The lower protrusion body 34c protrudes from a lower surface of the flange portion 34a and is shaped to be inserted into the interior of the lower stay body 33 from an upper end thereof. In Embodiment 1, the protrusion bodies 34b and 34c are respectively formed in a substantially C-shape in cross section, so as to respectively have slots 34d and 34e that extend longitudinally. As a result, when the protrusion bodies 34b and 34c are inserted into the upper and lower stay bodies 32 and 33, the protrusion bodies 34b and 34c are maintained therein by press fit engagement. Thus, the insulating member 34 of Embodiment 1 has a press fit engagement structure that is capable of preventing the same from slipping off.

Further, wiring 35 is disposed in each of the stays 31. One end of the wiring 35 is electrically connected to an electrode 36, and other end of the wiring 35 is electrically connected to the electrical component 30a (not shown in FIG. 4). The electrode 36 is formed from a metal plate spring and is inserted into the lower stay body 33 while it is flexed to have a reverse U-shape. Therefore, the electrode 36 is maintained in the lower stay body 33 due to a reaction force thereof. As a result, the lower stay body 33 and the electrical component 30a can be electrically connected to each other. Further, needless to say, when the head rest 30 is vertically adjustably connected to the seat back 10, portions that are positioned below the lowermost engagement groove 32a of the upper stay body 32 (the insulating member 34 and the lower stay body 33) are not exposed to an interior of the seat back 10. Another way to describe this is that "the lower stay body is set at a position in which the lower stay body is not exposed to an interior the seat back when the head rest is vertically adjustably connected to the seat back".

Next, an operation when the head rest 30 is connected to the seat back 10 thus constructed will be described. In a condition as shown in FIG. 5, the stay 31 of the head rest 30 (the lower stay body 33) is inserted into the insertion hole 13a of the support 13 that is positioned on an upper surface portion of the seat back 10. At this time, as described above, the protruding portions 25a of the M-shaped electrode 25 protrude into the support 13 via the cutout 13d of the support 13. Therefore, upon insertion of the stay 31 of the head rest 30 into the support 13, the protruding portions 25a of the electrode 25 protruding into the support 13 can be applied with a force via an outer circumferential surface of the inserted stay 31, so as to be pushed back.

Figure 6:
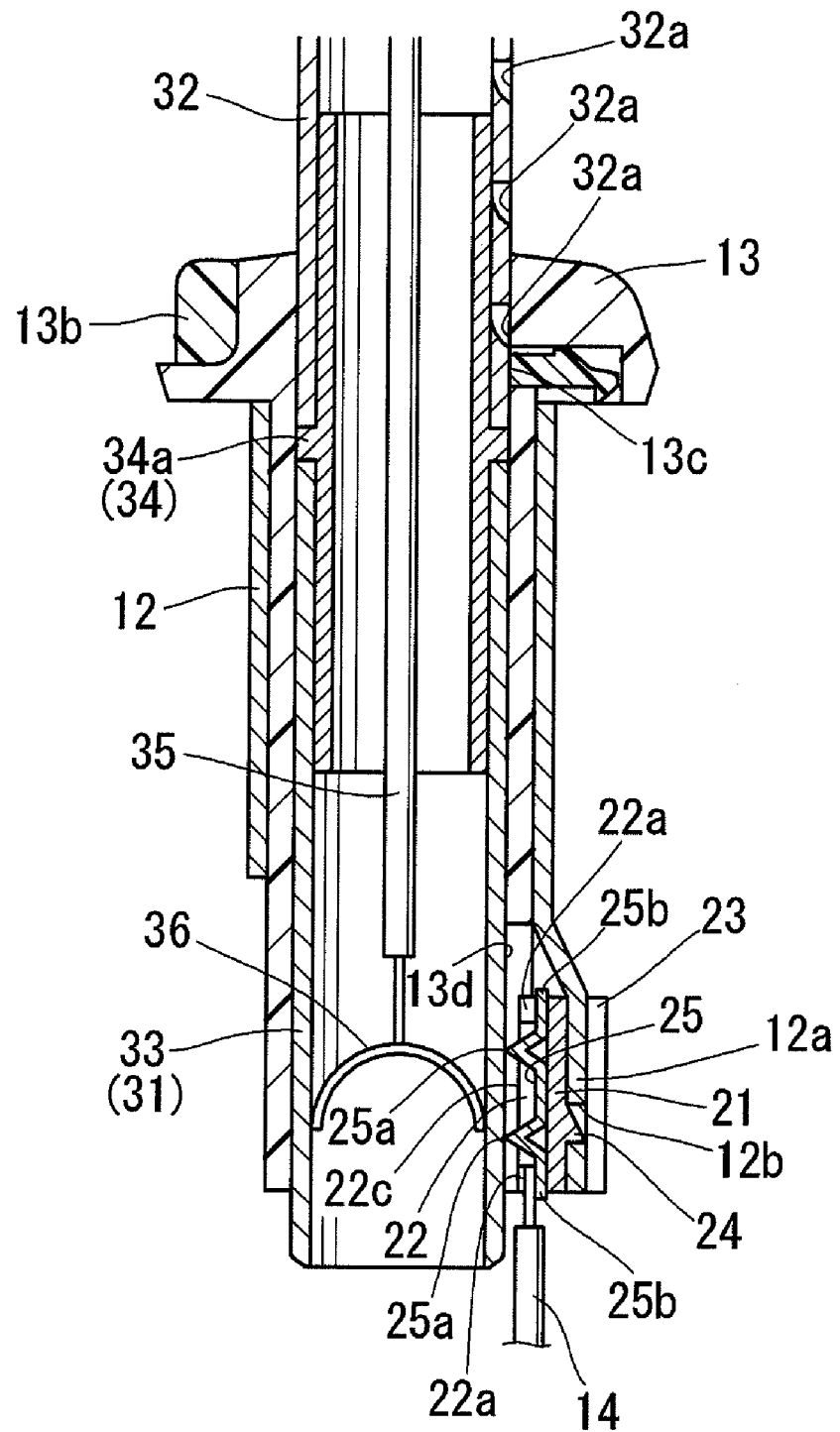
FIG. 6 is a view showing a condition in which the stay 31 of FIG. 5 is inserted into an insertion hole 13a of the support 13.

When force is applied to the protruding portions 25a, the electrode 25 is flexed such that the leg portions 25b thereof move in a direction away from each other. As a result, the protruding portions 25a of the electrode 25 are pressed against the outer circumferential surface of the stay 31 (the lower stay body 33) due to a reaction force of flexure of the electrode 25. Therefore, the protruding portions 25a of the electrode 25 can be electrically connectably pressed against the outer circumferential surface of the stay 31 (the lower stay body 33) (FIG. 6). Thus, electric power can be supplied to the electrical component 30a from the power source wiring 14 by using the stay 31 (the lower stay body 33) itself as an electrically conducting path.

Figure 7:
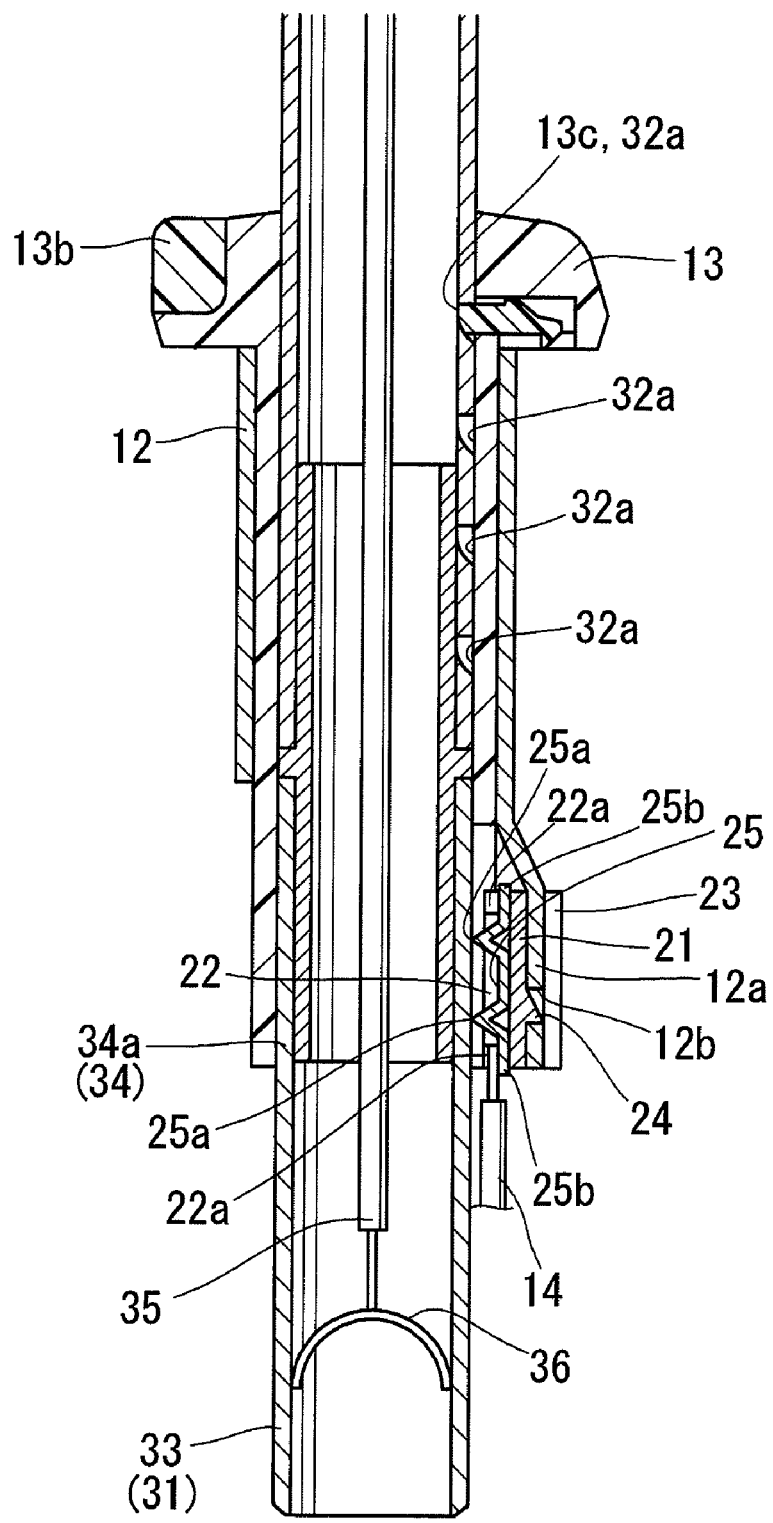
FIG. 7 is a view showing a condition in which the stay 31 of FIG. 6 is further inserted and in which a head rest 30 is positioned closest to a seat back 10 in a use condition thereof.
Figure 8:
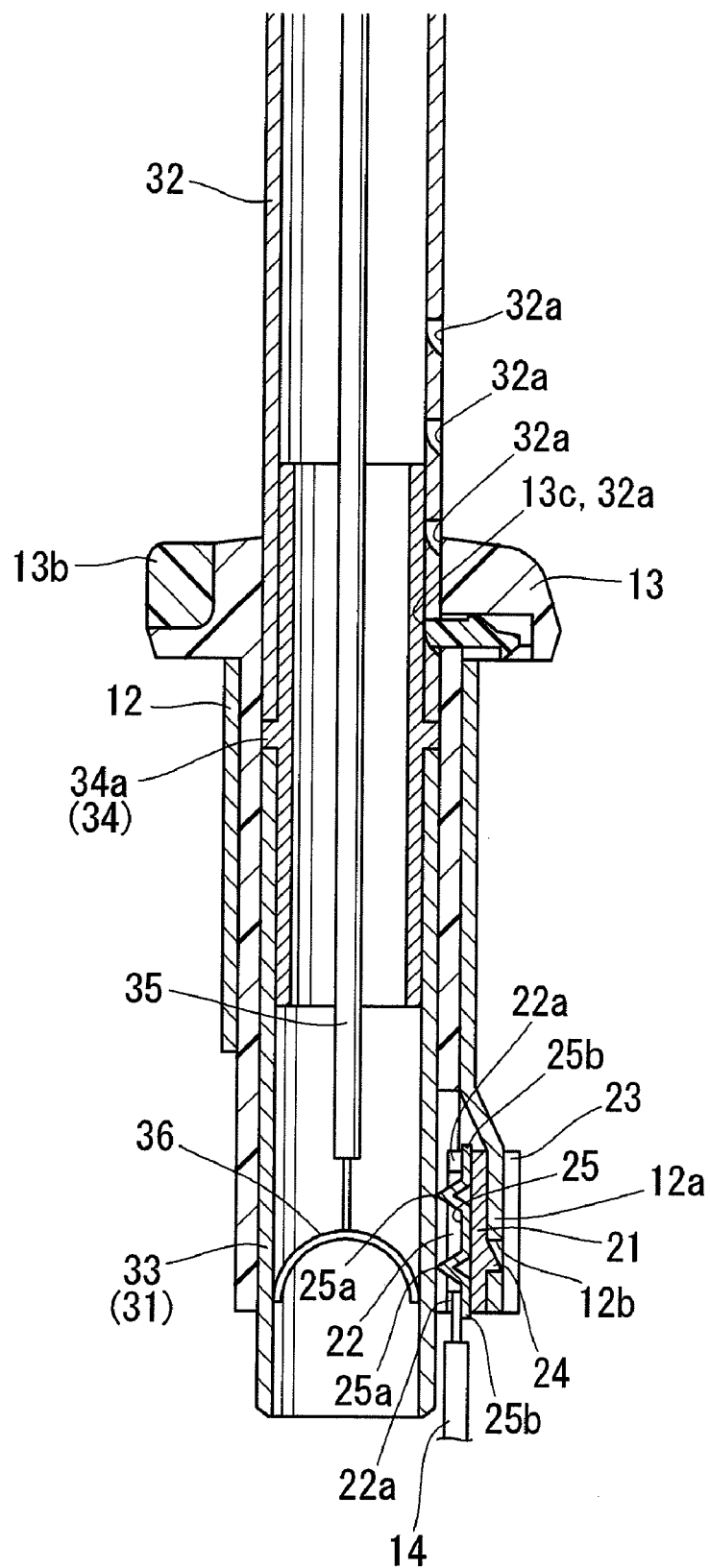
FIG. 8 is a view showing a condition in which the head rest 30 is positioned furthest away from the seat back 10 in the use condition thereof.

Further, because the protruding portions 25a of the electrode 25 are pressed to the stay 31, the protruding portions 25a of the electrode 25 can slidably contact the outer circumferential surface of the stay 31 (the lower stay body 33) even when the head rest 30 is vertically adjusted with respect to the seat back 10 (FIGS. 7 and 8). Thus, regardless of a vertical position of the head rest 30 with respect to the seat back 10, the electric power can be supplied to the electrical component 30a from the power source wiring 14. Further, the lower stay body 33 is always maintained in a condition in which the lower stay body 33 is inserted into the support 13 (a condition in which the lower stay body 33 is hidden inside the seat back 10). Therefore, the lower stay body 33 corresponding to an energized portion of the stay 31 cannot be exposed to an upper surface of the support 13. Thus, even when the electric power is supplied to the electrical component 30a from the power source wiring 14, a metal portion in an energized condition can be prevented from being exposed.

Embodiment 2

Figure 9:
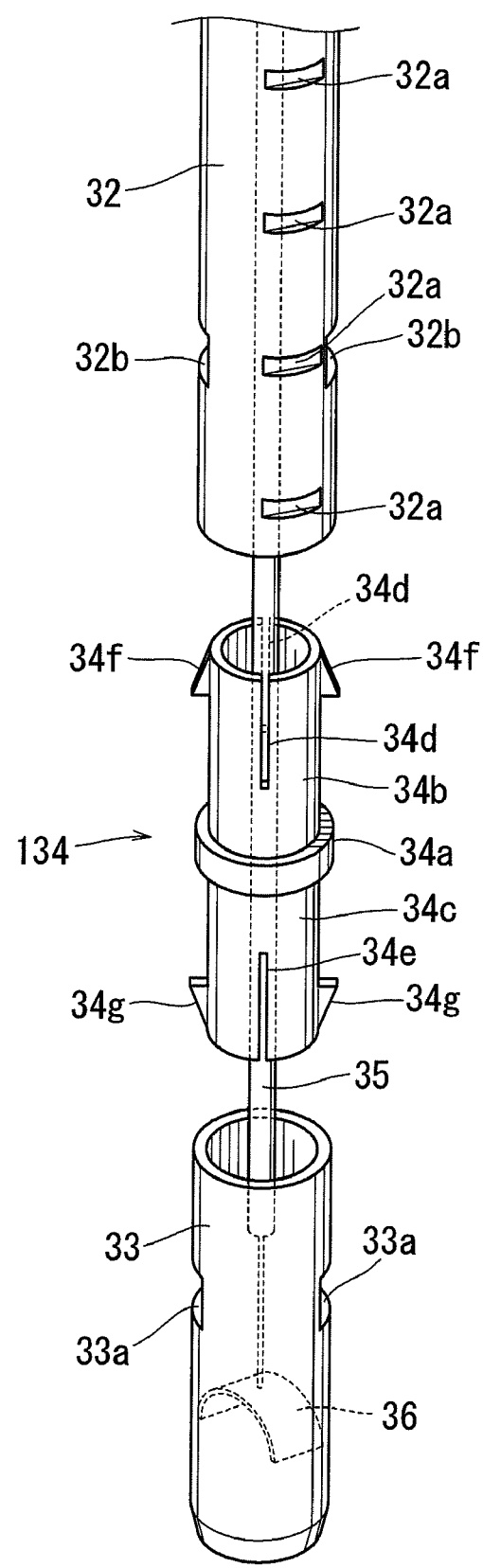
FIG. 9 is an exploded perspective view of a stay 31, which shows another embodiment (Embodiment 2).

Embodiment 2 will be described with reference to FIG. 9. As will be apparent from FIG. 9, as compared with Embodiment 1 described above, Embodiment 2 is intended to increase a slipping-off prevention function of the insulating member 34. Further, in the following description, elements that are the same as or equivalent to Embodiment 1 will be identified by the same reference numerals and a redundant description of such elements will be omitted. This will also apply to Embodiment 3 and subsequent embodiments.

Two slots 34d are formed in a distal end of an outer circumferential surface of the upper protrusion body 34b of an insulating member 134 according to Embodiment 2. The slots 34d are axisymmetrically formed and extend longitudinally. Further, two outwardly extending engagement claws 34f are axisymmetrically formed in the distal end of the outer circumferential surface of the upper protrusion body 34b. The engagement claws 34f are formed in positions that are circumferentially deviated by 90 degrees from the slots 34d. Conversely, two engagement holes 32b are formed in a lower end portion of the upper stay body 32. The engagement holes 32b are capable of engaging the engagement claws 34f of the upper protrusion body 34b when the upper protrusion body 34b is inserted into the upper stay body 32.

Similar to the upper protrusion body 34b and the upper stay body 32, the lower protrusion body 34c and the lower stay body 33 have slots 34e, two engagement claws 34g and two engagement holes 33a that are respectively formed therein. Similar to Embodiment 1, the protrusion bodies 34b and 34c are respectively inserted into the interiors of the upper and lower stay bodies 32 and 33, so that the stay 31 can be formed.

According to the construction described above, the insulating member 134 of Embodiment 2 has not only the press fit engagement structure described in Embodiment 1 but also an engagement structure in which the protrusion bodies 34b and 34c can be maintained in an insertion condition via the engagement claws 34f and 34g. Thus, as compared with the insulating member 34 of Embodiment 1, the insulating member 134 of Embodiment 2 has a slipping-off prevention function greater than the insulating member 34 of Embodiment 1.

Embodiment 3

Figure 10:
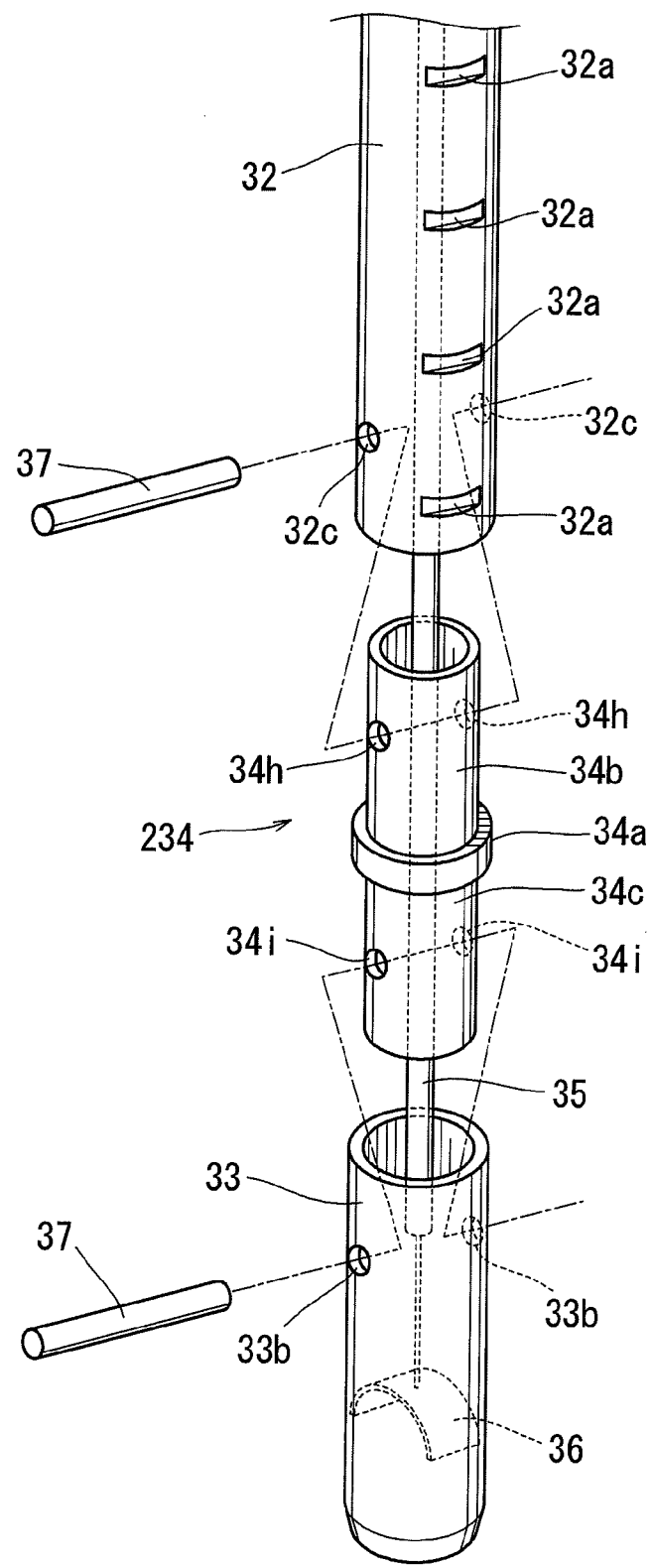
FIG. 10 is an exploded perspective view of a stay 31, which shows another embodiment (Embodiment 3).

Embodiment 3 will be described with reference to FIG. 10. As will be apparent from FIG. 10, as compared with Embodiment 2 described above, Embodiment 3 is intended to provide a slipping-off prevention function in a different form.

Two through holes 34h are formed in an outer circumferential surface of the upper protrusion body 34b of an insulating member 234 according to Embodiment 3. The through holes 34h are axisymmetrically formed. Conversely, two insertion holes 32c are formed in the lower end portion of the upper stay body 32. The insertion holes 32c are capable of being aligned with the through holes 34h of the upper protrusion body 34b when the upper protrusion body 34b is inserted into the upper stay body 32. Also, similar to the upper protrusion body 34b and the upper stay body 32, the lower protrusion body 34c and the lower stay body 33 have two through holes 34i and two insertion holes 33b that are respectively formed therein. After the upper protrusion body 34b is inserted into the interior of the upper stay body 32, a pin 37 is completely inserted into the through-holes 34h of the upper protrusion body 34b via one of the insertion holes 32c of the upper stay body 32 until the pin 37 reaches the other of the insertion holes 32c. Similarly, a pin 37 is passed through the lower protrusion body 34c and the lower stay body 33. Thus, the stay 31 can be formed.

As described above, the insulating member 234 described above has an engagement structure using the pins 37 in place of the engagement structure described in Embodiment 2. Thus, this embodiment has a simplified structure and has the same function as Embodiment 2.

Embodiment 4

Figure 11:
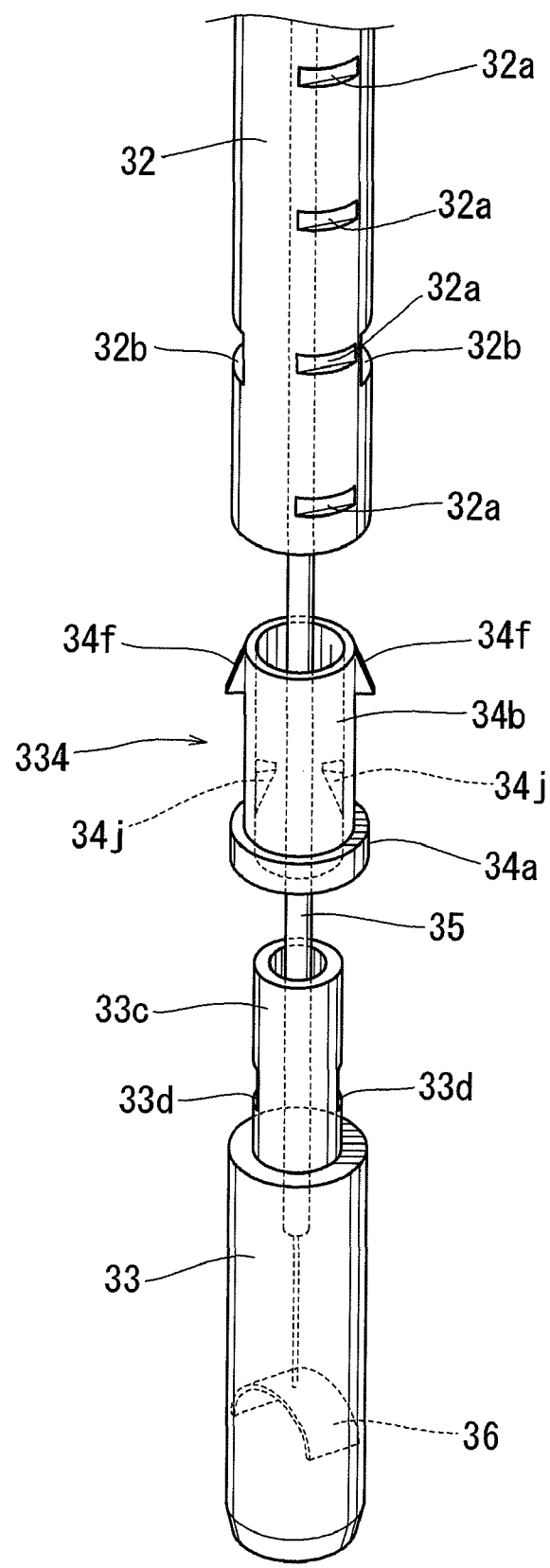
FIG. 11 is an exploded perspective view of a stay 31, which shows another embodiment (Embodiment 4).

Embodiment 4 will be described with reference to FIG. 11. As will be apparent from FIG. 11, as compared with Embodiment 2 described above, Embodiment 4 is intended to strengthen the insulating member 134.

Similar to the upper protrusion body 34b of Embodiment 2, two engagement claws 34f are formed in the distal end of the outer circumferential surface of the upper protrusion body 34b of an insulating member 334 according to Embodiment 4. In addition, two inwardly projected engagement claws 34j are axisymmetrically formed in a distal end of an inner circumferential surface of the upper protrusion body 34b. Conversely, a tapered portion 33c is formed in the upper end of the lower stay body 33. The tapered portion 33c is shaped to be inserted into an interior of the upper protrusion body 34b from the lower surface of the flange portion 34a. Two engagement holes 33d are formed in a proximal end of the tapered portion 33c. The engagement holes 33d are capable of engaging the two engagement claws 34j formed in the upper protrusion body 34b when the tapered portion 33c is inserted into the upper protrusion body 34b. The upper protrusion body 34b is inserted into the upper stay body 32 and the tapered portion 33c of the lower stay body 33 is inserted into the upper protrusion body 34b. Thus, the stay 31 can be formed.

As described above, in the insulating member 334 of Embodiment 4, the tapered portion 33c of the lower stay body 33 is constructed to be inserted into the flange portion 34a. That is, in Embodiment 4, the flange portion 34a can have a strength corresponding to the sum of a strength of the tapered portion 33c of the lower stay body 33 and an inherent strength of the flange portion 34a. To the contrary, the flange portion 34a of Embodiment 2 can have only the inherent strength thereof. As a result, as compared with the insulating member 134 of Embodiment 2, the flange portion 34a of the insulating member 334 of Embodiment 4 can have an increased strength.

Embodiment 5

Figure 12:
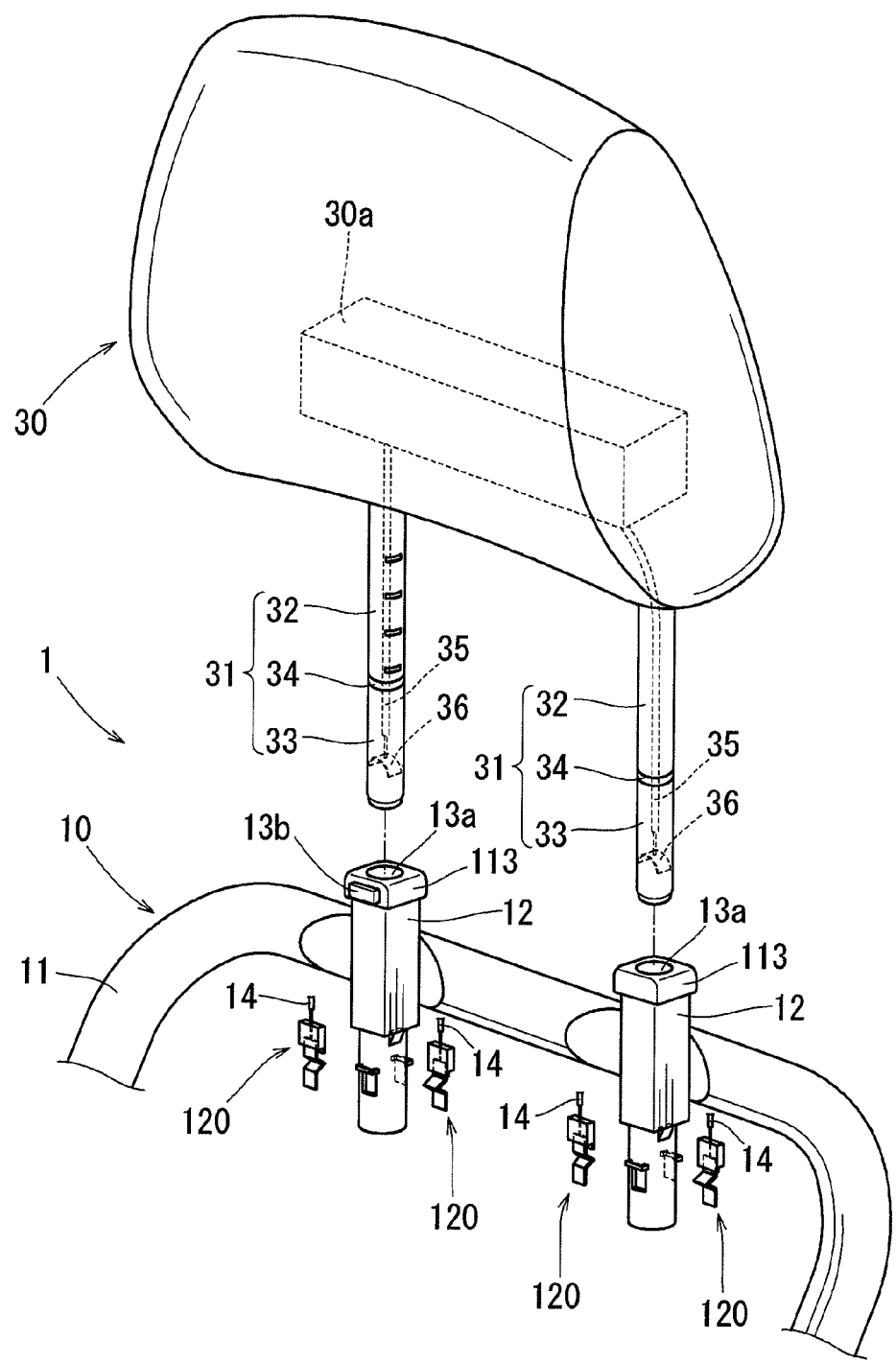
FIG. 12 is an exploded perspective view of a vehicle seat 1 to which a wiring structure for a head rest according to another embodiment (Embodiment 5) of the present invention is applied.

Embodiment 5 will be described with reference to FIGS. 12 to 14. As will be apparent from FIG. 12, as compared with Embodiment 1 described above, Embodiment 5 is constructed such that the protruding portions 25a (a protruding portion 125a in Embodiment 4) of the electrode 25 (an electrode 125 in Embodiment 4) can slidably contact the stay 31 in a different form. Further, FIG. 12 shows a condition in which the supports 13 are already inserted into the holders 12.

Figure 13:
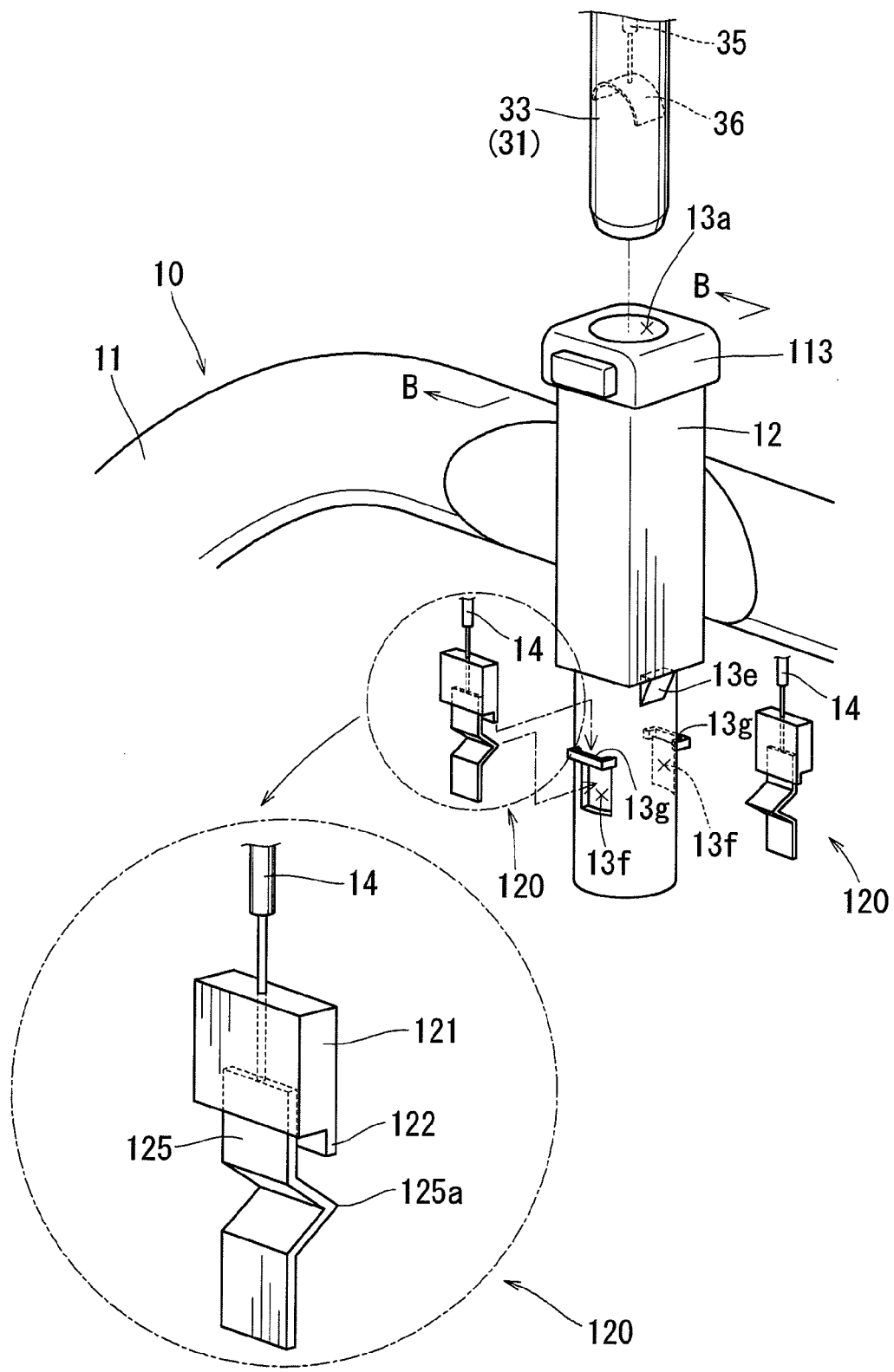
FIG. 13 is an enlarged view of a main portion of FIG. 12.
Figure 14:
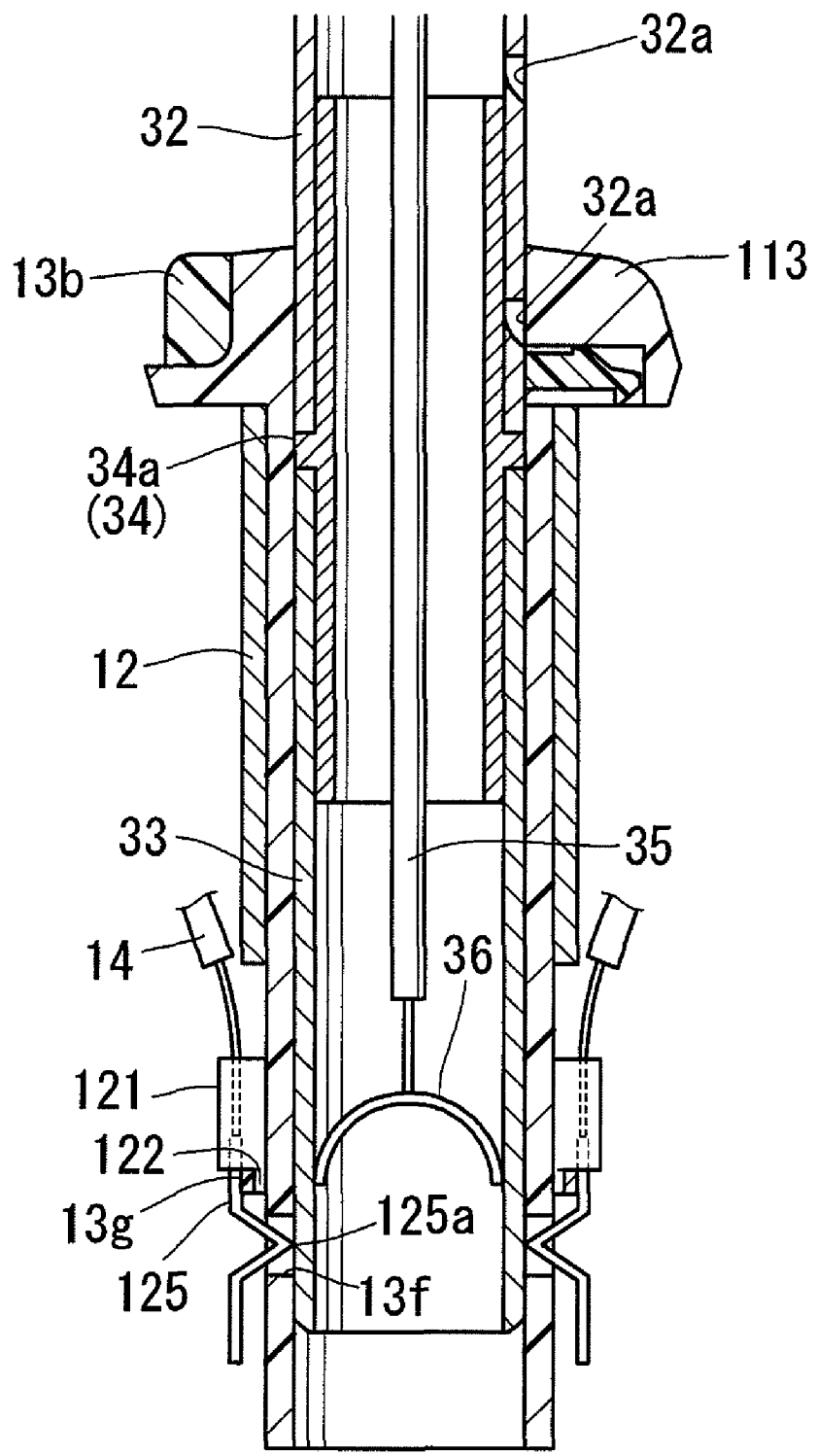
FIG. 14 is a sectional view taken along line B-B of FIG. 13, which corresponds to FIG. 6.

As shown in FIG. 13, each of the electrode bodies 120 in Embodiment 5 is constructed of a base member 121 made of resin and an electrode 125. The electrode 125 is formed by insert molding so as to extend downwardly from a lower surface of the base member 121. The electrode 125 is constructed of a plate spring in which a portion thereof is bent in a U-shape in cross section so as to have a protruding portion 125a. Further, the protruding portion 125a of the electrode 125 corresponds to the protruding portions 25a of the electrode 25 described in Embodiment 1. In addition, an attachment strip 122 is integrally formed in the lower surface of the base member 121. The attachment strip 122 extends downwardly from the base member 121 toward the protruding portion 125a of the electrode 125.

Conversely, attachment portions 13g are formed in lower portions of front and back sides of each of the supports 113 in Embodiment 5. Each of the attachment portions 13g has a U-shape in cross section, so that the attachment strip 122 of the electrode 120 described above can be hooked thereon. Further, the front and back sides of the support 113 has cutout windows 13f that are respectively positioned below the attachment portions 13g. Therefore, when the attachment strips 122 of the electrodes 120 are hooked on the attachment portions 13g of the support 113 and the stay 31 is then inserted into the support 113 in this hooked condition, the protruding portions 125a of the electrodes 125 and the outer circumferential surface of the stay 31 are electrically connectably pressed against each other (FIG. 14). Thus, similar to Embodiment 1, the protruding portions 125a of the electrode 125 and the outer circumferential surface of the stay 31 are capable of slidably contacting each other.

According to a structure described above, similar to Embodiment 1, it is possible to slidably contact the protruding portions 125a of the electrodes 125 and the stay 31 each other without providing the attachment strips 12a to the holders 12. Thus, this embodiment has a simplified structure and has the same function as Embodiment 1.

Embodiment 6

Embodiment 5 will be described with reference to FIGS. 15 to 17. As will be apparent from FIG. 15, as compared with Embodiment 5, in Embodiment 6, the electric power is supplied to the electrical component 30a via only one of the stays 31.

Figure 15:
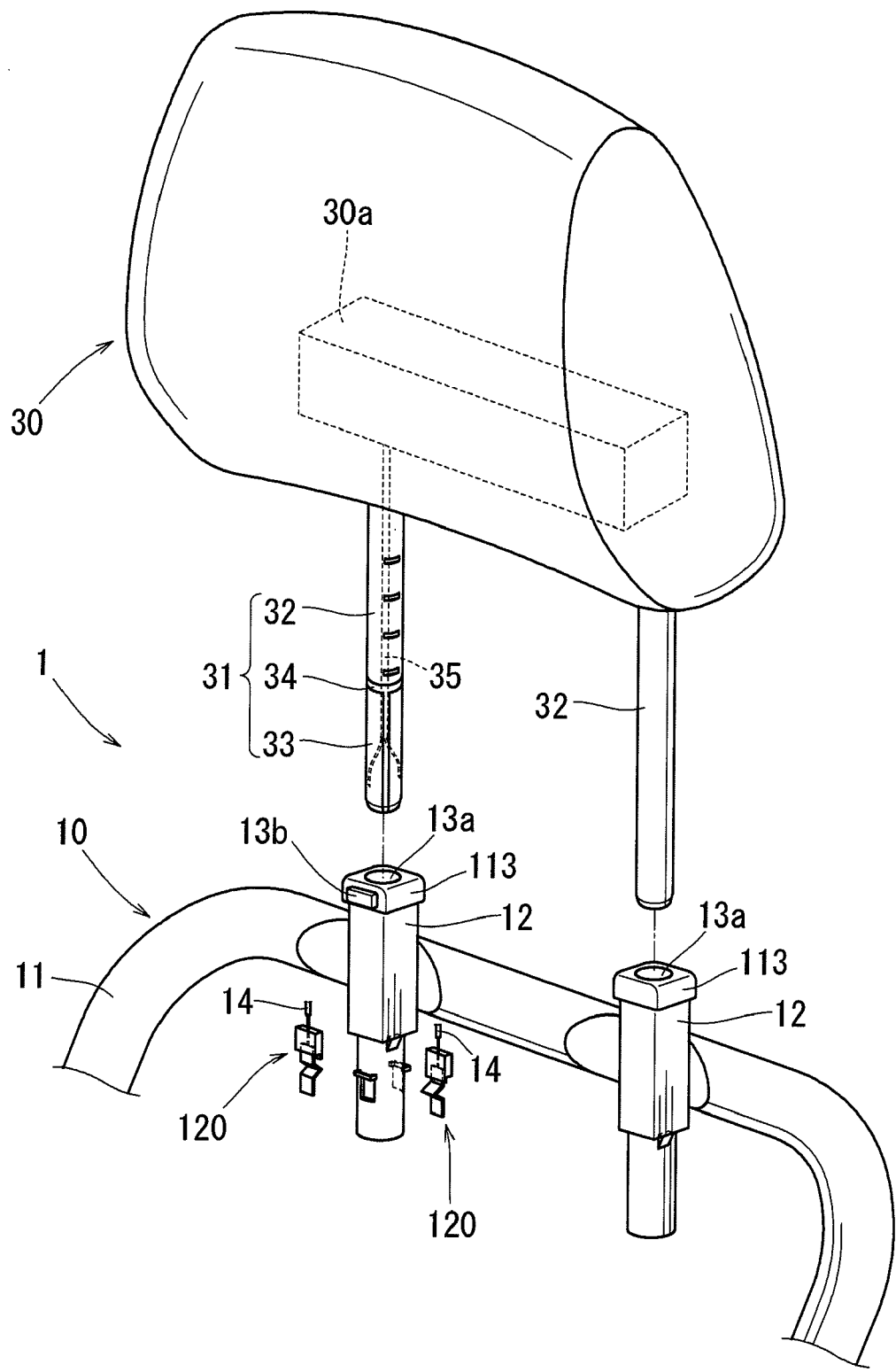
FIG. 15 is an exploded perspective view of a vehicle seat 1 to which a wiring structure for a head rest according to another embodiment (Embodiment 6) of the present invention is applied.
Figure 16:
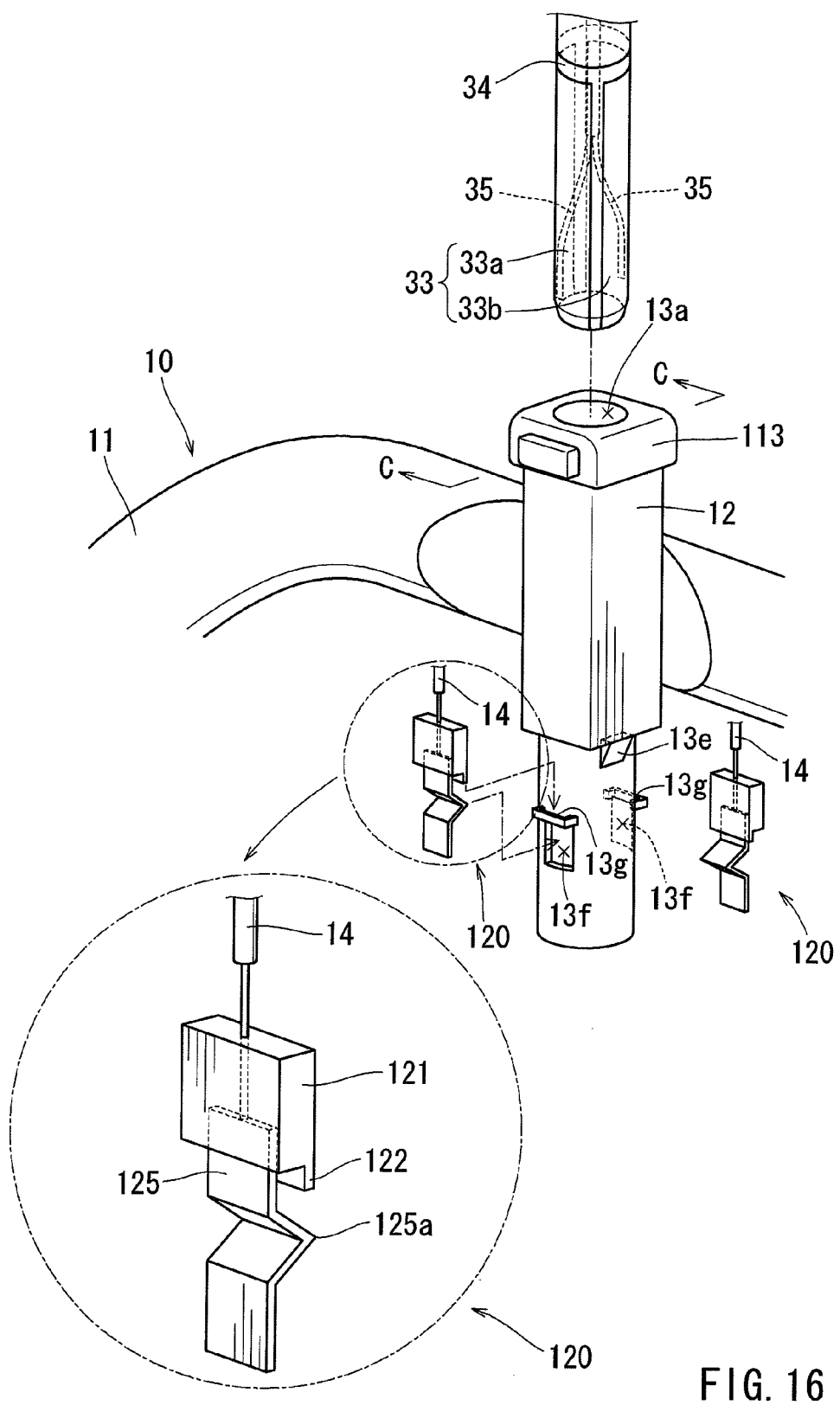
FIG. 16 is an enlarged view of a main portion of FIG. 15.
Figure 17:
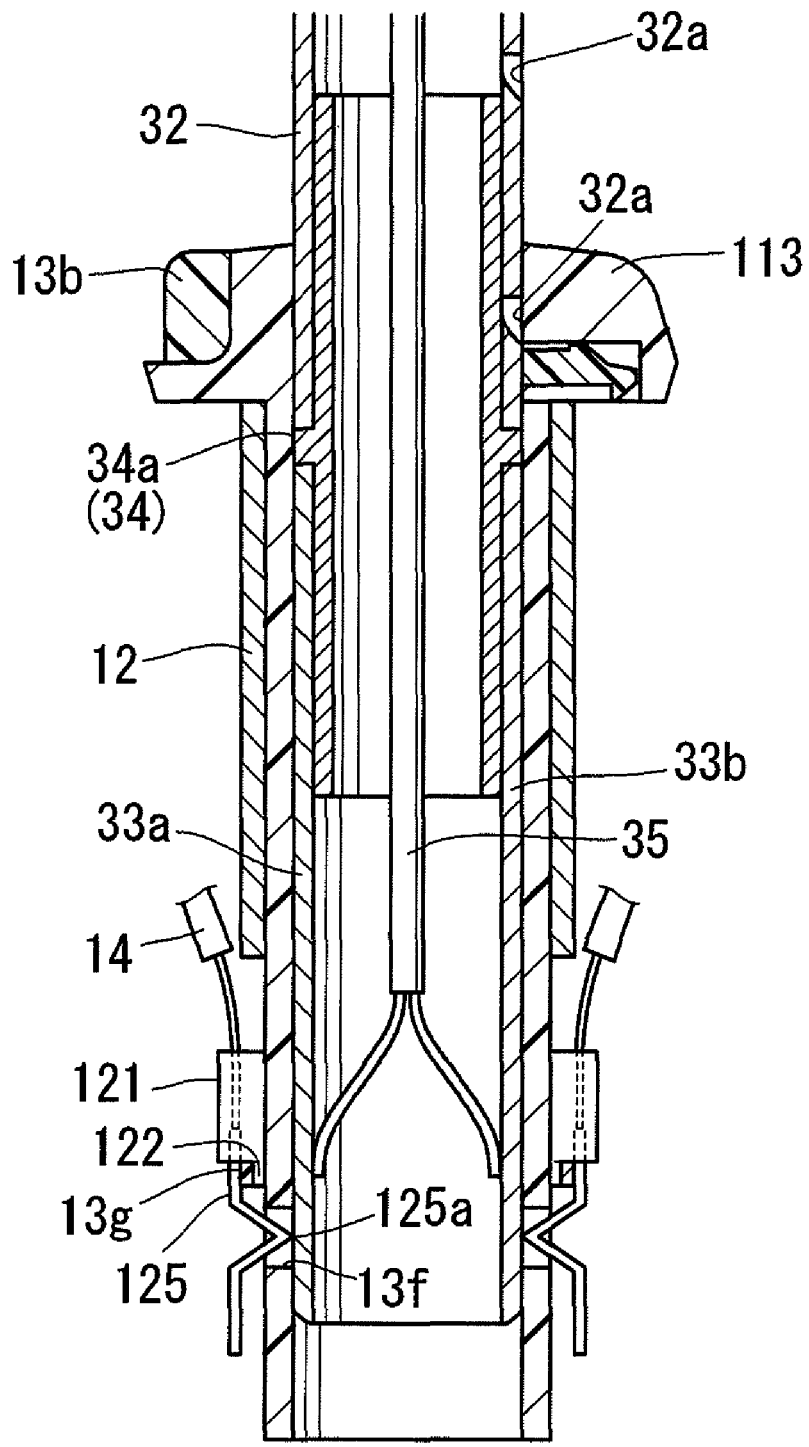
FIG. 17 is a sectional view taken along line C-C of FIG. 16, which corresponds to FIG. 6.

As shown in FIGS. 15 to 17, the lower stay body 33 of Embodiment 6 is divided into a first lower stay body 33a and a second lower stay body 33b by the insulating member 34 such that they are insulated from each other. Further, the wiring 35 in Embodiment 6 has a two-core structure. Ends of two cores wires of the wiring 35 are respectively electrically connected (e.g., by soldering) to inner circumferential surfaces of the first lower stay body 33a and the second lower stay body 33b.

Embodiment 6 is constructed as described above. That is, in this embodiment, only one of the stays 31 is used as the electrically conducting path whereas in Embodiment 5 described above, both of the stays 31 are uses as the electrically conducting path. Therefore, this embodiment can have the same function as Embodiment 5 with a simplified structure.

Representative examples of the present invention have been described. However, this description is not intended to limit the scope of the invention. In Embodiment 1, the electrode bodies 20 are respectively attached to the attachment strips 12a of the holders 12, so that the protruding portions 25*a* of the electrodes 25 of the attached electrode bodies 20 can slidably contact the outer circumferential surfaces of the stays 31.

In Embodiment 5, the electrode bodies 120 are respectively attached to the supports 113, so that the protruding portions 125*a* of the electrodes 125 of the attached electrode bodies 120 can slidably contact the outer circumferential surface of the stays 31. However, the structures should not be restrictively construed. For example, the electrode bodies 20 (120) can be variously disposed in the seat back 10 provided that the protruding portions 25*a* (125*a*) of the electrodes 25 (125) of the electrode bodies 20 (120) is capable of slidably contacting the outer circumferential surface of the stays 31.

Further, in the embodiments described above, the exemplified stays 31 of the head rest 30 are respectively formed of tubular metal members each having a circular shape in cross section. However, the stays 31 can be formed of tubular metal members each having a square shape, a rectangular shape or other such shapes in cross section.

The invention claimed is:

1. A wiring structure for a head rest for supplying electric power to an electrical component electrically connected to a stay formed of a tubular metal member and disposed in the head rest that is vertically adjustably connected to a seat back via the stay, in which a stationary electrode electrically connected to power source wiring disposed on a seat back side is electrically connectably pressed against an outer circumferential surface of the stay, so that the stay itself can be used as a portion of an electrically conducting path, wherein the stay is provided with an insulating member that is disposed in a vertically intermediate position thereof, wherein an upper stay body disposed on an upper side of the insulating member is electrically insulated with a lower stay body disposed on a lower side of the insulating member, wherein the lower stay body is set at a position in which the lower stay body is not exposed to an interior of the seat back when the head rest is vertically adjustably connected to the seat back, and wherein the lower stay body and the electrical component are electrically connected to each other via wiring disposed in the upper stay body, so that the electric power can be supplied to the electrical component from the power source wiring.

2. The wiring structure for a head rest as defined in claim 1, wherein an engagement portion engageable with the seat back side is formed in the stay at a lowermost position of a vertically controllable range thereof, and wherein an engaged portion engageable with the engagement portion is formed in the seat back side.

* * * * *